United States Patent [19]

Dias et al.

[11] Patent Number: 5,655,080
[45] Date of Patent: Aug. 5, 1997

[54] DISTRIBUTED HASH GROUP-BY COOPERATIVE PROCESSING

[75] Inventors: Daniel Manual Dias, Mahopac, N.Y.; Randy Lynn Egan, Rochester; Roy Louis Hoffman, Pine Island, both of Minn.; Richard Pervin King, Thornwood, N.Y.; Kurt Walter Pinnow, Rochester, Minn.; Christos Alkiviadis Polyzois, Chatham Township, N.J.

[73] Assignee: International Business Machines Corporation, Armonk, N.Y.

[21] Appl. No.: 514,543

[22] Filed: Aug. 14, 1995

[51] Int. Cl.⁶ .................................................. G06F 9/00
[52] U.S. Cl. ........................................... 395/200.32
[58] Field of Search ................... 395/200.01, 200.03, 395/200.09, 200.15, 200.18, 821, 842, 439, 600, 650, 375, 700, 800, 200.05, 825–827; 364/131, 133, 591.01, 554

[56] References Cited

U.S. PATENT DOCUMENTS

| 4,989,131 | 1/1991 | Stone | 395/379 |
|---|---|---|---|
| 5,317,568 | 5/1994 | Bixby et al. | 370/401 |
| 5,321,816 | 6/1994 | Rogan et al. | 364/408 |
| 5,369,570 | 11/1994 | Parad | 395/208 |
| 5,546,584 | 8/1996 | Lundin et al. | 395/700 |
| 5,548,724 | 8/1996 | Akizawa et al. | 395/200.03 |
| 5,550,962 | 8/1996 | Nakamura et al. | 395/133 |
| 5,557,798 | 9/1996 | Skeen et al. | 395/650 |

*Primary Examiner*—Alpesh M. Shah
*Attorney, Agent, or Firm*—Whitham, Curtis, Whitham & McGinn; Kevin Jordan

[57] ABSTRACT

A method is provided for parallel and cooperative processing of data in a system wherein a coordinator process cooperates with one or more agent processes to which portions of the data processing function is off loaded. The agent processes read and process the data and accumulate a partial result. Each agent process, responsive to statistics collected on the content of the data processed, returns a partial result of the processing to the coordinator process. These steps are repeated iteratively until the processing has been completed. In a specific application, the performance of data processing systems is improved by speeding up database group-by queries. The group-by operation processing is distributed between the host central processing unit (CPU) and the input/output (I/O) processors (IOPs). Essentially, the IOPs are sent group-by requests to be performed on a set of disk blocks (extents), along with a predicate for tuples to be selected for query. The IOPs build a hash table with entries of the group-by element and a running aggregation function (sum for example). The IOPs retrieve the extents, extract the records, select records using the predicate specified, enter the element in the hash table if it is not already there, and perform the corresponding aggregation function.

10 Claims, 3 Drawing Sheets

DISTRIBUTED HASH GROUP-BY COOPERATIVE PROCESSING

DESCRIPTION

BACKGROUND OF THE INVENTION

1. Field of the Invention

The present invention generally relates to database processing by general purpose digital computers and, more particularly, to off loading some database processing functions from a coordinator process running on a main central processing unit (CPU) to cooperating agent processes running on, for example, input/output processors (IOPs) attached to the main CPU.

2. Background Description

The general objective of the subject invention is to gain better performance, both shorter response time and more throughput, than is possible in current data processing systems. In particular, the specific problem addressed is that of speeding up relational database group-by queries. The group-by operation is fairly common in queries for decision support. For example, consider a query on a sales table with each tuple representing a sales transaction. Suppose that each tuple has fields for the following: commodity_id commodity_info number_sold sales_amt customer_info . . . One may want to retrieve the number of items sold per commodity by the query select commodity_id, sum (number_sold) from sales group by commodity_id or the sales amount per commodity, by substituting sales_amt the query in place of the number_sold. Similar group-by queries could provide averages, counts, etc. Group-by clauses such as these are fairly common in decision support queries used for making decisions on stocking, shelf application, trends analysis, etc.

SUMMARY OF THE INVENTION

It is therefore an object of the present invention to improve the performance of data processing systems wherein a coordinator process cooperates with one or more agent processes.

It is another, more specific object of the invention to improve the performance of data processing systems by speeding up database group-by queries.

According to the invention, a method is provided for parallel and cooperative processing of data in a system wherein a coordinator process cooperates with one or more agent processes to which portions of the data processing function is off loaded. The agent processes read and process the data and accumulate a partial result. Each agent process, responsive to statistics collected on the content of the data processed, returns a partial result of the processing to the coordinator process. These steps are repeated iteratively until the processing has been completed.

In a specific application of the invention, a group-by operation processing is distributed between a host CPU and connected I/O processors (IOPs). Essentially, the IOPs are sent group-by requests to be performed on a set of disk blocks (extents), along with a predicate for tuples to be selected for query. The IOPs build a hash table with entries of the group-by element (commodity_id in the above example) and the running aggregation function (sum in the above example). The IOPs retrieve the extents, extract the records, select records using the predicate specified, enter the element in the hash table if it is not already there, and perform the corresponding aggregation function.

If the number of distinct elements in the group-by query (commodity_id in the example) is small, then the entire hash table can be built in the IOP. In this case, the hash table is returned to the host processor by each IOP at the end of their corresponding scans. The host processor combines the hash tables from the IOPs and returns the resulting data to the caller. For some aggregation function, such as average, the hash table entries will also need to have additional information, such as counts, so that the results from the different IOPs can be combined.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
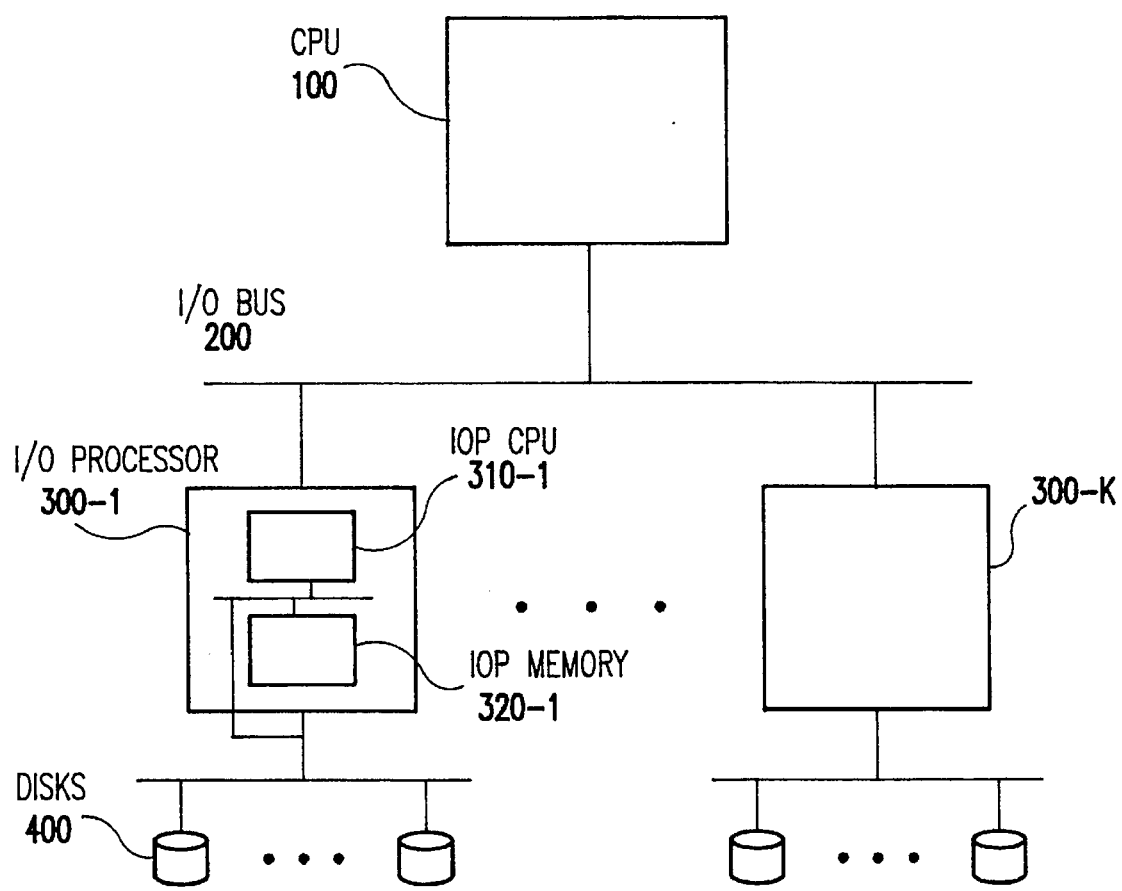
FIG. 1 is block diagram showing a system comprising a host CPU having a plurality of connected IOPs.

Referring now to the drawings, and more particularly to FIG. 1, there is shown a block diagram of a typical computer system on which the subject invention may be implemented. An example of a specific computer system on which the invention may be implemented is the International Business Machines Corp. AS/400 computer system. The main central processing unit (CPU) 100 communicates via an input/output (I/O) bus 200 with a plurality of direct access storage devices (DASDs). In the example illustrated the DASDs are disc drives $400_1$ to $400_n$ connected to I/O bus 200 via I/O processors (IOP) $300_1$ to $300_k$. Taking IOP $300_1$ as exemplary, each IOP includes an IOP CPU $310_1$ and an IOP memory $320_1$.

The invention implemented on the system shown in FIG. 1 is a method for parallel and cooperative processing of data. In the system shown in FIG. 1, parallel processing occurs when multiple IOPs are present. In a more general application, it will be understood by those skilled in the art that parallel processing also occurs when there are multiple host CPUs present in a distributed system. In the system shown in FIG. 1, a coordinator process running on the host CPU 100 cooperates with one or more agent processes on the IOPs $300_i$ to which portions of the data processing function is off loaded. The agent processes read and process the data and accumulate a partial result. Each agent process, responsive to statistics collected on the content of the data processed, returns a partial result of the processing to the coordinator process. These steps are repeated iteratively until the processing has been completed.

Figure 2:
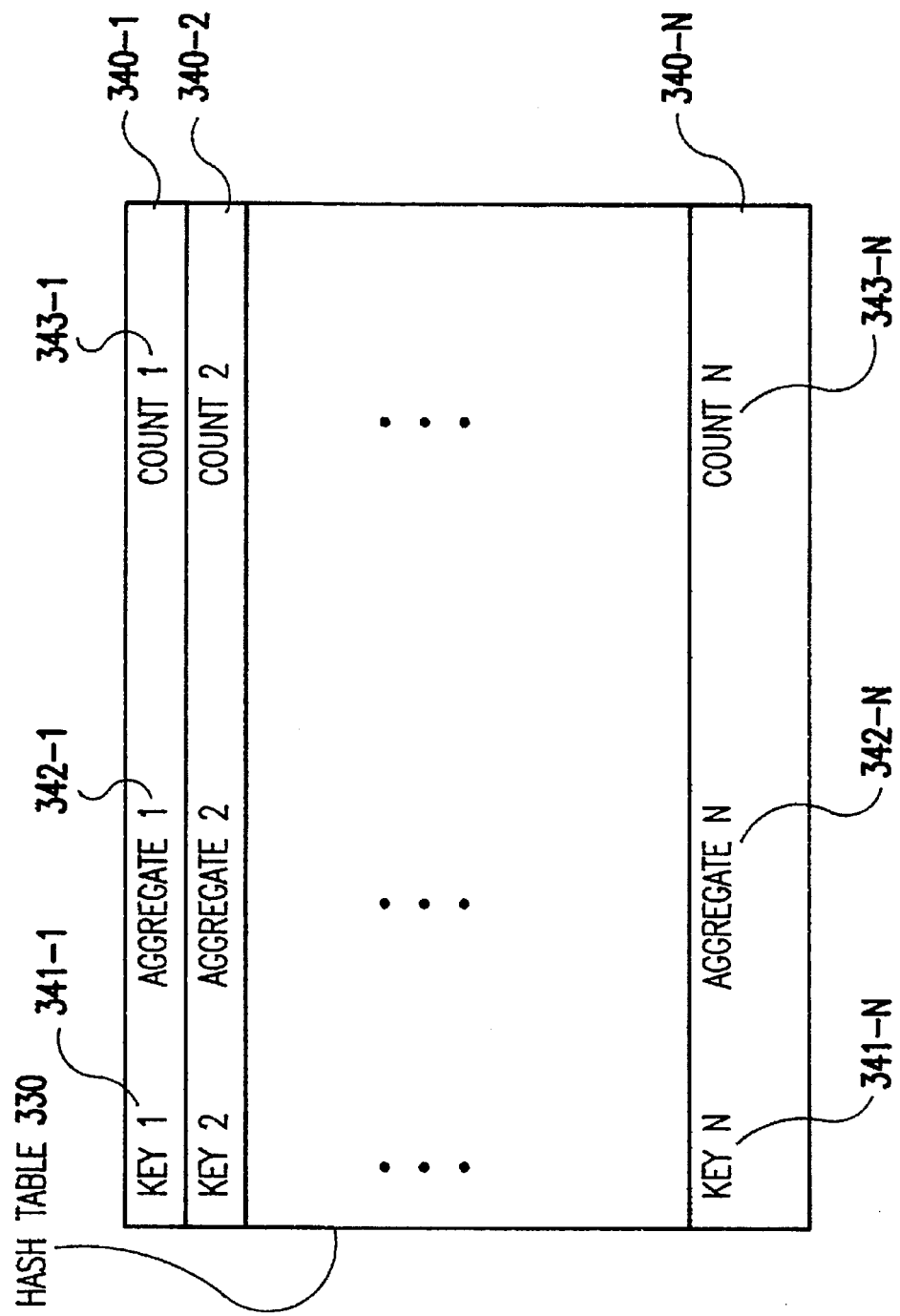
FIG. 2 is a diagram showing the structure of the hash table built by a connected IOP.

In a specific application of the invention, the group-by operation processing is distributed between the host CPU 100 and the IOPs $300_1$ to $300_k$. The IOPs are sent group-by requests to be performed on a set of disk blocks. The IOP CPUs $310_i$ build hash tables in the IOP memories $320_i$ with entries of the group-by element and the running aggregation function. An example of a hash table is shown in FIG. 2. The hash table is in the form of a plurality of rows and columns. In the example illustrated, there are N rows, $340_1$ to $340_N$, and three columns, 341, 342 and 343, each column representing a different field and each row having the same fields.

The first field in column 341 is the key field, or the field on which the table is searched. The second field in column 342 is the aggregate field. The third field 343 is the count (CNT) field. The IOPs 300$i$ retrieve the extents, extract the records, select records using the predicate specified, enter the element in the hash table if it is not already there, and preform the corresponding aggregation function.

If the number of distinct elements in the group-by query is small, then the entire hash table can be built in the IOP memories $320_i$. In this case, the hash table is returned to the host CPU 100 by each IOP at the end of their corresponding scans. However, if the number of elements in the group-by query is large, then the memories $320_i$ may be insufficient to contain the entire hash table. This can easily occur, if, for example, the number of commodities in the above example is greater than 100K (one hundred thousand), which is estimated to require more than a megabyte of IOP storage for the hash table.

According to the invention, in order to handle this case, the elements are entered into the hash table until it is full. The partial hash table is then sent back to the host for combining with other hash tables from other IOPs. The scan of data on the IOP proceeds and builds a hash table with the remaining elements until the hash table is again full or the scan is complete, and so on. Returning the partial hash table to the host CPU may take significant time because of its large (or moderate) size. Therefore, the partial hash table may be sent back to the host CPU before the IOP runs out of memory. The next partial hash table can be built concurrently with sending the previous partial hash table to the host CPU.

Figure 3:
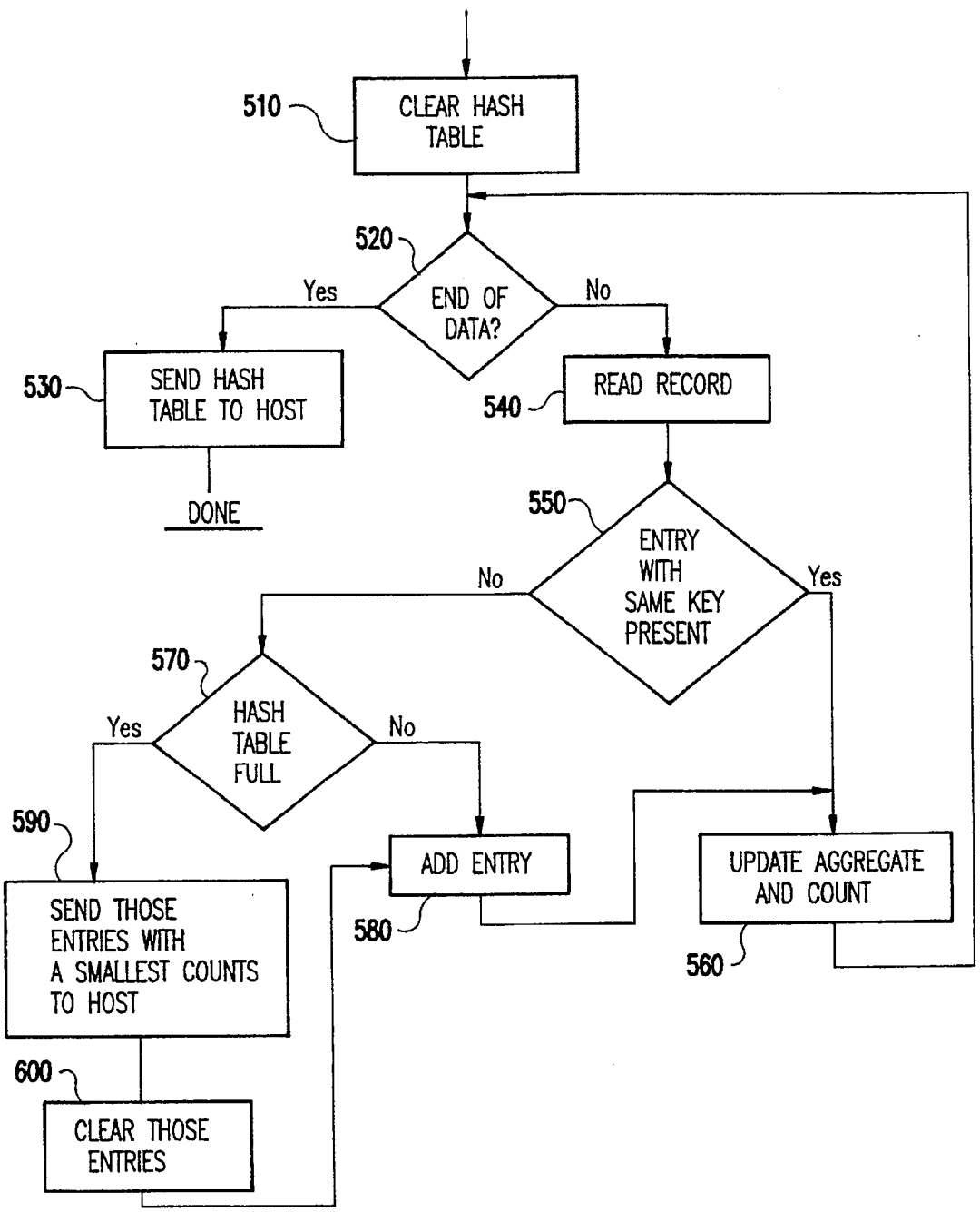
FIG. 3 is a flow diagram showing the process implemented by the invention.

The process is illustrated in the flow diagram of FIG. 3, to which reference is now made. The process begins in function block 510 by clearing the hash table. A test is next made in decision block 520 to determine if the data scan is complete. If so, the hash table is sent to the host CPU in function block 530; otherwise, the next record is read in function block 540. A test is made in decision block 550 to determine if there is an entry in the hash table having the same key. If so, the aggregate and the count are updated in function block 560, and a return is made to decision block 520. If, on the other hand, there is no entry with the same key present, a further test is made in decision block 570 to determine if the hash table is full. If not, the entry is added in function block 580 before the aggregate and count are updated in function block 560. If the hash table is full, those entries with the smallest counts are sent to the host CPU in function block 590, and after that is done, those entries are cleared in function block 600. Having done this, the entry can be added in function block 580.

An optimization of this method is as follows. In most cases, such as the sales example, the distribution of entries (commodity_ids in this case) is highly skewed. The most popular, say top 1000 commodities in the example, capture a large fraction of all the entries. The remaining elements have very few entries. The strategy then is to capture the hot items (e.g., commodities with many sales) on the IOPs and to return their hash entry values (i.e., aggregates) only at the end of the scan. The hot entries will likely have many subsequent entries and it is therefore an unnecessary overhead to send them to the host with each partial hash table. The cold items that have few entries will be returned when the hash table fills. The key to this strategy is to determine which are the hot and cold elements (commodities). This is done by using the statistics (counts) of the number of entries per element, which can be maintained in the hash table. The count is necessary anyway for some aggregation functions, such as average or count. In the basic scheme, the hash table entries with the largest counts are retained in the IOP, and the remainder are sent back to the host CPU as a partial hash table. The number of hash table entries deemed to be hot is a tunable parameter. For instance, if 10,000 hash table entries can be retained in the IOP, perhaps 7,500 entries can be reserved for the entries with the highest counts, and the remainder returned to the host CPU.

The basic scheme assumes that the items with the largest counts are hot and will continue to be hot for the remainder of the scan. This may be true for some cases, especially if the order of the extents scanned is random. It may not be true if the tuples are examined in entry order (e.g., cabbage patch dolls may go out of favor). A generalization of this scheme is to base the designation of hot items on both overall statistics to the point of the scan and on recent history of access. For example, the scan can keep count of the tuples accessed (CNT), which should serve as a time stamp. Each hash table entry could have a time stamp field with the value of CNT at the time of the last entry of this element. If a hash table entry has a large count but the time since the last entry was beyond a threshold, then the item would be declared as cold even if the count was large enough to otherwise qualify as hot. Those skilled in the art will readily appreciate that other methods of keeping a history of last access, such as depth in a least recently used (LRU) chain, could also be used. For instance, a periodic background process (say, triggered when CNT gets to multiples of a selected value) could zero a field in the hash table. The field could be set to one for each new entry in the hash table. If the entry is zero when next examined, the item could be declared to be cold. Alternatively, a separate count since the last time the hash table filled could be used. Variations such as these are within the scope of the invention.

The performance objectives of the invention have been met because the usage of the main CPU is reduced. Spare disk IOP cycles are used to perform the group-by function. Cycles in the main CPU will only be used when it is necessary to combine results from processing on one or more IOPs. In addition, main memory usage is reduced. The IOPs perform processing and data filtering, meaning that only relevant data resulting from the processing operation are sent to the main memory.

While the invention has been described in terms of a single preferred embodiment with optimization and alternative procedures, those skilled in the art will recognize that the invention can be practiced with modification within the spirit and scope of the appended claims.

Having thus described our invention, what we claim as new and desire to secure by Letters Patent is as follows:

1. A computer-implemented method for parallel and cooperative processing of data in a distributed data processing system having at least one host central processing unit (CPU) and one or more input/output processors (IOPs), wherein the data is a table of a relational database and wherein a coordinator process on the on the host CPU cooperates with one or more agent processes on the IOPs, comprising the steps of:

off loading by the coordinator process a portion of a data processing function to the agent processes;

responding to the portion of the data processing function off loaded by the coordinator process by reading and processing data from the table of relational database by the agent processes;

accumulating, by each of the agent processes, partial results of the processing performed by the particular agent process;

responsive to statistics collected on the content of the data processed, returning some of the partial results from the agent processes to the coordinator process; and iteratively repeating the previous steps until the portion of the data processing function off loaded by the coordinator process has been completed and all partial results of the off loaded data processing function have been returned to the coordinator process.

2. The method of claim 1, wherein the result of the processing is a set of elements determined by a group-by query, and wherein the statistics include a partial count of a number of tuples corresponding to each of the elements in the set to be finally returned.

3. The method of claim 2, wherein the elements with the smallest partial counts are returned to the coordinator process.

4. The method of claim 1, wherein at least some of the agent processes are executed on different nodes of the system.

5. The method of claim 4, wherein at least one of the agent processes is executed on a different node than the coordinator process.

6. The method of claim 5, wherein the coordinator process is executed on a central processing unit and the agent processes are executed on one or more input/output processing units.

7. A distributed data processing system for parallel and cooperative processing of data in the system, wherein a coordinator process on the system cooperates with one or more agent processes, comprising:

one or more input/output processors (IOPs), each said input/output processor including an input/output central processing unit and an input/output memory, an agent process running on said input/output processor;

a host central processing unit (CPU) on which a coordinator process is run, said coordinator process cooperating with each said agent process, said coordinator process off loading a portion of a data processing function to the agent processes running on the input/output processors;

an input/output bus connecting said main central processing unit with said plurality of input/output processors; and at least one direct access storage device connected to each of said plurality of input/output processors, said direct access storage device storing the data as a table of a relational database, each said agent process reading and processing data, accumulating partial results of the processing, and responsive to statistics collected on the content of the data processed, returning some of the partial results from the agent process to the coordinator process, each said agent process iteratively repeating the reading and processing data, accumulating partial results and returning some of the partial results until the processing has been completed and all partial results of the off loaded data processing function have been returned to the coordinator process.

8. The distributed computer system as recited in claim 1 wherein the result of the processing by each said agent process is a set of elements determined by a group-by query, and wherein the statistics include a partial count of a number of tuples corresponding to each of the elements in the set to be finally returned.

9. The distributed computer system as recited in claim 8 wherein the elements with the smallest partial counts are returned to the coordinator process by each said agent process.

10. The distributed computer system recited in claim 7 wherein there are a plurality of input/output processors, each said input/output processor running an agent process cooperating with said coordinator process.

* * * * *